May 13, 1952 P. MONDET 2,596,271
PRESSURE GAUGE
Filed April 21, 1950 2 SHEETS—SHEET 1
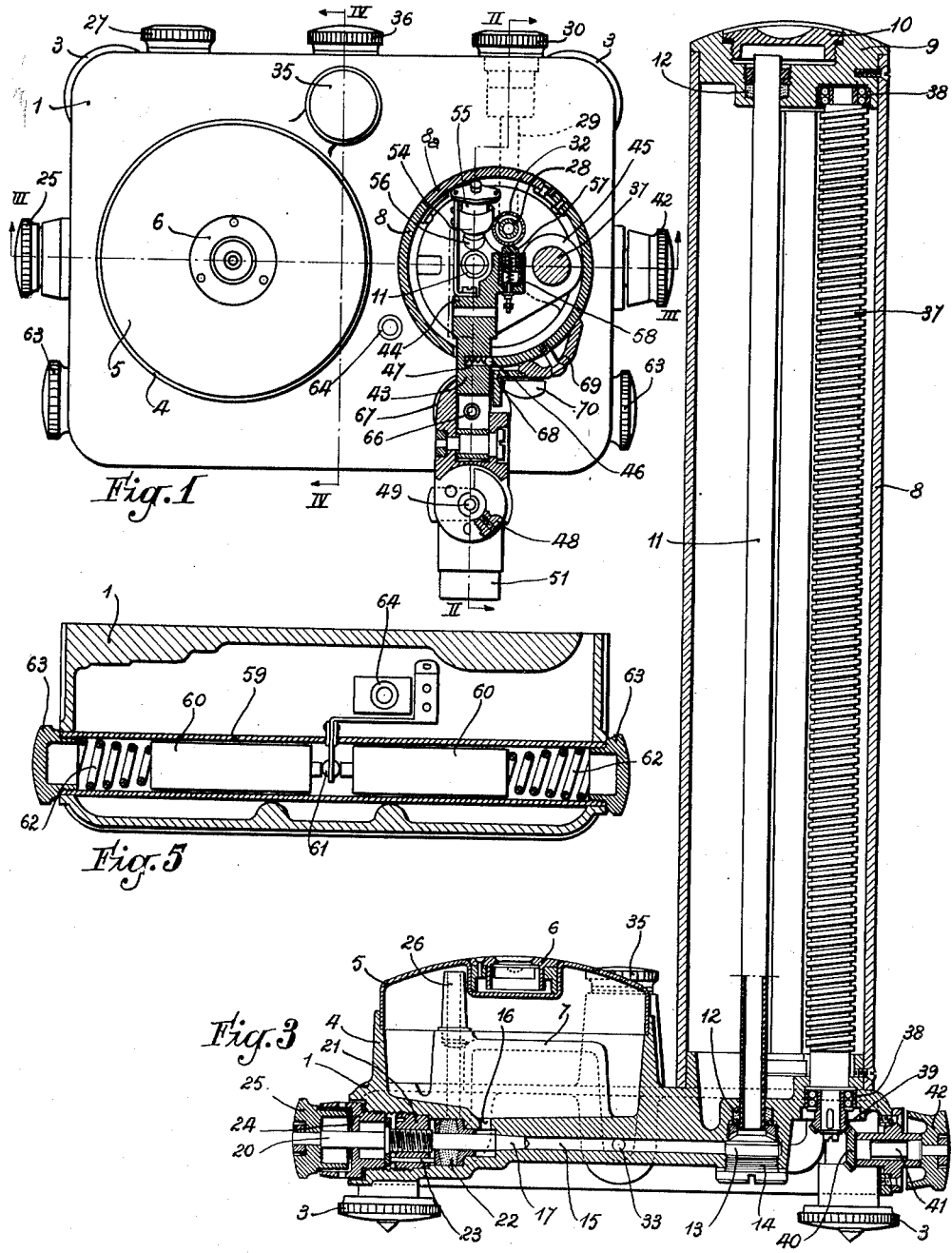
INVENTOR.
Paul Mondet
BY
attorneys

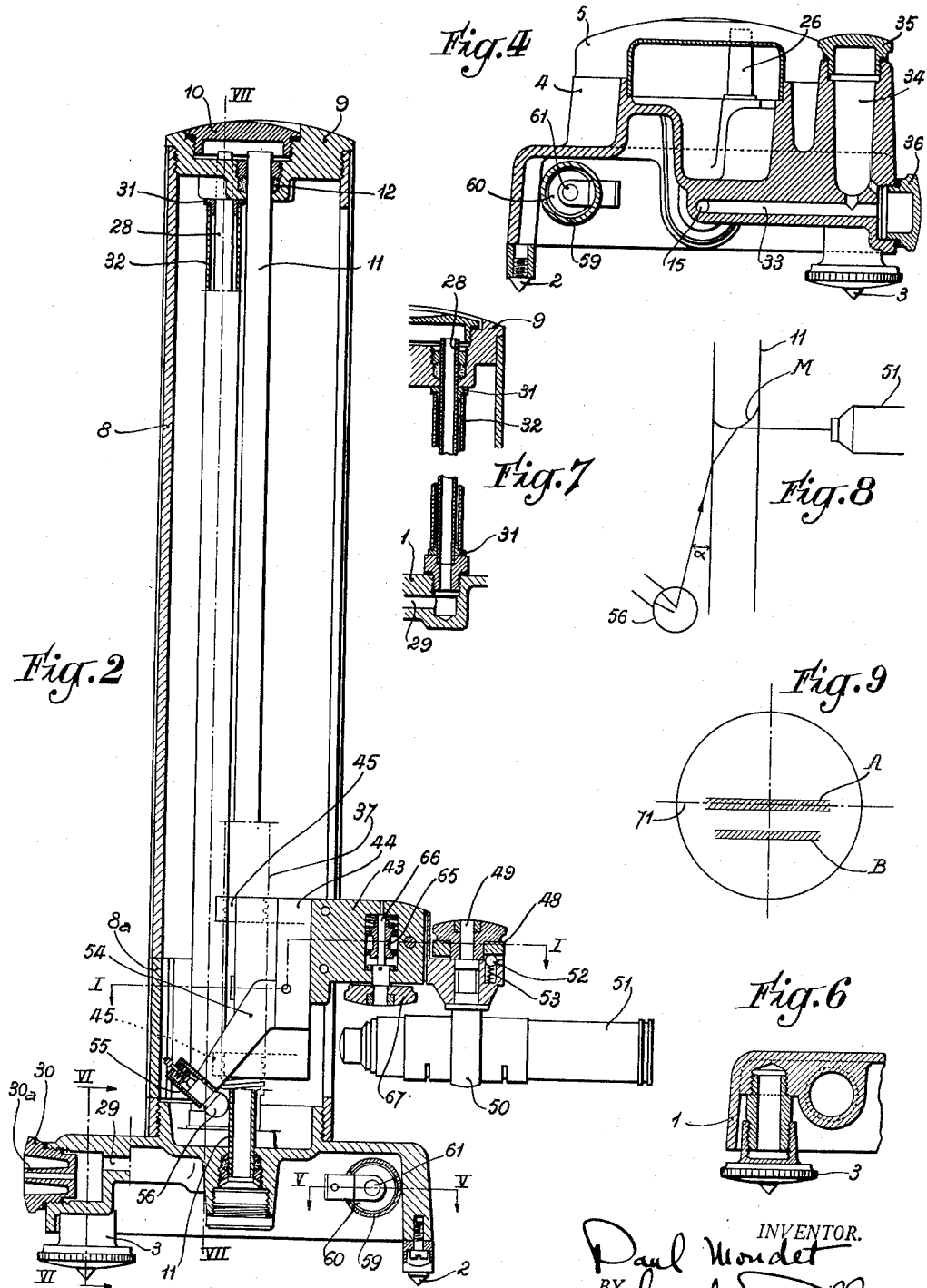

Patented May 13, 1952

2,596,271

UNITED STATES PATENT OFFICE 2,596,271

PRESSURE GAUGE

Paul Mondet, Lyon, France, assignor to Ateliers Ventil, Lyon, France, a French joint-stock company Application April 21, 1950, Serial No. 157,270
In France February 14, 1950

3 Claims. (Cl. 73—392)

My invention relates to pressure gauges wherein there is used a liquid such as water.

In such pressure gauges the difference between the pressure to be measured and the outer atmospheric pressure causes a corresponding difference in the level of the liquid in the glass tube of the gauge. The variation of this level may be measured by optical means ensuring a high degree of precision. The difficulty is that the upper surface of the liquid within the tube is not a geometrical plane but a concave surface or meniscus; the upper limit of this meniscus cannot be ascertained and the lowermost point thereof (center of the meniscus) is not clearly visible in a horizontal sighting telescope. This drawback limits the possibilities of this type of pressure gauge.

A first object of my invention is to provide means whereby the position of the meniscus in the glass tube of the gauge may be ascertained without any difficulty and without any risk of error even by a comparatively untrained operator.

Another object of my invention is a pressure gauge of the liquid type wherein the lower face of the meniscus in the glass tube is used as a convex mirror to form an optical image of a light source disposed at a definite distance below the meniscus and laterally of the glass tube, the said image being observed in a horizontal sighting telescope vertically displaceable along the said glass tube.

Still a further object of my invention is a pressure gauge comprising a liquid reservoir, a vertical glass tube in communication with this reservoir, a carriage vertically slidable along the said glass tube, a sighting telescope horizontally carried by the said carriage to permit observation of the glass tube, and an electric bulb also carried by the said carriage below the plane of the telescope and on the opposed face of the glass tube with respect to the said telescope to form on the lower face of the liquid meniscus within the glass tube an optical image which may be seen in the lunette.

In the annexed drawings:

Fig. 1 is a general plan view of my improved pressure gauge, with parts in section through line I—I of Fig. 2.

Figs. 2, 3 and 4 are sections taken along lines II—II, III—III and IV—IV (Fig. 1).

Figs. 5, 6, and 7 are sections taken along lines V—V, VI—VI and VII—VII (Fig. 2).

Fig. 8 is a diagrammatical view illustrating the operation of the gauge.

Fig. 9 is a large scale view showing the optical image of the electric bulb on the meniscus as it appears in the telescope.

The apparatus illustrated in Fig. 1 comprises a base 1 supported by a fixed support 2 and by two levelling screws 3. Base 1 is integral with a reservoir 4 which contains the liquid ensuring operation of the gauge, for instance water. Reservoir 4 has a comparatively large horizontal section in such a manner that the inner water level therein is only slightly affected by the variations of the water level in the glass tube. The residual influence may easily be taken into account by properly graduating the scale of the apparatus, as it will be readily understood. Reservoir 4 is tightly closed by a cover 5 which is soldered in position. Cover 5 carries a small water level 6 to permit of properly levelling the apparatus.

The effective volume of reservoir 4 is reduced to a minimum by inner projections such as 7 (Fig. 3) which however do not reach the normal level of water within the reservoir.

Base 1 carries laterally of reservoir 4 a hollow vertical cylindrical column 8 of relatively large diameter (Fig. 3). Column 8 is closed at its upper end by a cover 9 in which there is formed a small inner chamber tightly closed by an upper cap 10.

Within column 8 there is provided a vertical tube 11 made of a transparent material such as glass and which is intended to form the so-called glass tube of the gauge. The upper end of tube 11 is passed through a packing gland 12 and opens into the inner chamber of cover 9, while its lower end is similarly passed through another packing gland 12 and opens into a small chamber 13 in base 1, the said chamber 13 being closed by a lower cap 14. It will be understood that caps 10 and 14 give access to both packing glands 12 and permit of easily replacing tube 11 when necessary.

Chamber 13 communicates with a horizontal conduit 15 provided in base 1 and this conduit is connected by a passage 16 with the lower part of reservoir 4. Between the said conduit 15 and passage 16 there is interposed an adjustable damping valve 17 formed by the conical end of a rod 20 which is screwed in a sleeve 21 having an outer screw-threaded periphery. Sleeve 21 is in turn screwed in a screw-threaded bore provided in base 1 in line with respect to conduit 15. A packing gland 22 is disposed around rod 20, such packing gland being pressed by means of small longitudinal rods 23 which are passed through sleeve 21, these rods 23 being in turn pressed by a ring 24 screwed in the bore of base 1. An outer knob 25 permits actuation of valve 17.

Base 1 supports a vertical tube 26 which opens within reservoir 4 immediately below cover 5. Tube 26 communicates with a lateral nozzle 27 (Fig. 1) by means of which the upper space of reservoir 4 may be connected either with the outer atmosphere or with a tube, tank or other closed space within which a positive pressure is to be measured, as explained below.

The inner chamber provided in cover 9 under cap 10 is connected by a vertical tube 28 with a horizontal conduit 29 provided in base 1, such conduit communicating in turn with a second lateral nozzle 30 (Figs. 1 and 2) by means of which the upper end of tube 11 may be connected either with the outer atmosphere or with a tube, tank or like closed space within which a negative pressure is to be measured. As shown in Fig. 2, tube 28 extends through column 8 in parallel relation to tube 11.

Nozzles 27 and 30 are preferably constructed as indicated in Fig. 2, by means of an outer blind sleeve opening outwardly and formed with an inner tube 30a of short length. It will be understood that when a rubber hose is engaged into such a nozzle, tube 30a is forced into the hose while the latter is prevented against radial expansion by the inner wall of sleeve 30. There is thus easily obtained an air-tight connection.

It will be noted that tube 28 (Fig. 7) supports two insulating washers 31 which carry a metallic tube 32 extending from base 1 to cover 9. As it will be hereinafter explained, tube 32 is used to transmit electric current to the movable carriage of the gauge.

The above-described conduit 15 communicates with a conduit 33 (Figs. 3 and 4) which in turn communicates with a vertical pipe 34 disposed laterally with respect to reservoir 4. Pipe 34 is closed by means of a cap 35 and it is used for filling the apparatus. Conduits 15 and 33 are slightly sloping in such a manner that air bubbles may escape freely during the filling operation either towards reservoir 4 or towards pipe 34. A removable valve cap 36 (Fig. 4) is provided to permit access to conduit 33. The height of pipe 34 is such as to exactly correspond to the normal level of liquid within reservoir 4, in such a manner that all the operator has to do to fill the gauge is to pour liquid until the level reaches the upper end of the filling pipe.

Column 8 carries a vertical screw 37 (Fig. 3) supported at both ends by ball bearings 38 respectively carried by base 1 and by cover 9. The lower end of screw 37 carries a bevel pinion 39 which meshes with a bevel gear 40 carried by a horizontal shaft 41 rotatably supported by base 1, such shaft 41 being provided with an outer actuating knob 42.

Column 8 is formed with a longitudinal slit through which there is passed an arm 43 (Fig. 1) integral with a carriage 44 carrying two screw-threaded rings 45 (Fig. 2) adapted to form nuts on screw 37. Any longitudinal play between carriage 44 and screw 37 is taken up by devices not shown, and which may be of any description, for instance of the kind used in the construction of machine-tools. Arm 43 is also provided with spring-pressed balls adapted to bear on the edges of the longitudinal slit of column 8. One of these spring and ball devices has been illustrated in Fig. 1, the ball being referenced 46 and the spring 47; it will be easily understood that a similar device is provided to co-act with the opposed edge of the slit. This arrangement enables arm 43 and carriage 44 to move vertically along column 8 without however rotating about the axis of screw 37. The outer end of arm 43 supports a horizontal lug 48 (Fig. 2) carrying a vertical pivot 49 integral with the support 50 of a horizontal sighting telescope 51. A spring and ball device 52—53 forms an elastic lock whereby telescope 51 is retained either at the position at which it is pointing towards tube 11 through the slit of column 8, or at a position at right angles to the first one, this second position being used to reduce the overall dimensions of the apparatus when the latter is not in use.

Carriage 44 also supports an arm 54 (Figs. 1 and 2) carrying at its free end a socket 55 for a small low-voltage electric bulb 56 disposed close to tube 11. One of the terminals of bulb 56 is grounded while the other is connected to a small spring-pressed brush 57 movable in an insulating socket 58 supported by carriage 44, the said brush being adapted to slidably bear against the insulated tube 32. The lower part of column 8 has an openable window 8a to permit easy access to bulb 56.

Base 1 carries a horizontal tube 59 (Fig. 5) enclosing two cylindrical electric cells 60 disposed in opposed relation each side of a central contact 61 against which they are pressed by springs 62 bearing against removable caps 63. It will be understood that the anodes of cells 60 are thus connected in parallel by means of contact 61, while springs 62 form a connection between the cathodes of cells 60 and base 1. Contact 61 is connected to a switch 64 which is in turn connected with tube 32.

Arm 43 (Fig. 2) is provided with a vertically elongated opening in which there is slidably disposed a small carriage 65 actuated by a vertical screw 66 having a lower actuating knob 67. Carriage 65 supports a vernier 68 adapted to slide along a scale 69 fixed to column 8. A lens 70 is carried by vernier 68 to facilitate readings.

The gauge above-described is used as follows:

Reservoir 4 is first filled with an appropriate liquid, for instance water. Nozzles 27 and 30 being both open carriage 44 is lowered towards the lower part of scale 69. The operator then observes the water level in tube 11 through telescope 51. Referring to Fig. 8 it will be seen that light rays from bulb 56 pass through the wall of tube 11, strike the lower face of the meniscus M and are reflected towards telescope 51. If the latter is properly positioned the operator should therefore see the optical image of the filament of bulb 56. In actual practice this image is strongly deformed and owing to parasitical reflections a second or parasitical image is also visible in such a manner that, if bulb 56 is properly adjusted, there appears in telescope 51 a pair of luminous lines A and B (Fig. 9) horizontally disposed one above the other. Carriage 44 is then displaced by means of knob 42 until the more brilliant of lines A and B is in coincidence with the horizontal wire 71 of the reticle. Knob 67 is thereafter actuated to bring the zero of vernier 68 in exact coincidence with the zero of scale 69. The gauge is then ready for use.

In order to measure a positive pressure, nozzle 27 (Fig. 1) is connected to the space within which this pressure is to be measured. The air or other gas under pressure thus acts through tube 26 on the water level within reservoir 4 and the level rises in tube 11. Knob 42 is then actuated and carriage 44 is raised until line A is again in coincidence with the horizontal wire of telescope 51. The height of water or manometric head corresponding to the positive pressure to be measured is then directly read on scale 69 by means of vernier 68. If, as it often occurs, the water level within tube 11 is not steady but oscillates irregularly, these oscillations are easily damped by progressively closing valve 17 (Fig. 3) by means of knob 25 until a correct observation is possible.

When a negative pressure is to be measured, nozzle 27 is left open to the outer atmosphere and nozzle 30 is connected with the tube, pipe, container or like closed space within which the pressure is to be measured. Water rises in tube 11 under the suction effect thus produced at the upper end of the said tube and the manometric head corresponding to the pressure to be measured is determined as above explained.

It will be observed that for any position of carriage 44 the vertical distance between bulb 56 and the meniscus M remains constant, whatever may be the height of column 8 and of screw 37. The luminosity of the images observed in the telescope is thus constant and the telescope is adjusted once for all for the distance of the virtual image formed in the meniscus.

It will be understood that my invention is in no way limited by the above description. The glass tube such as 11 in which the liquid rises under the action of the pressure to be measured will generally be vertical, but in some instances it may be more or less oblique, in which case the movable carriage should move obliquely along the tube. Also it is of advantage that the telescope should be arranged horizontally to observe the image of the bulb in the meniscus, but it could as well be disposed obliquely.

I claim:

1. A pressure gauge comprising a base; a reservoir carried by said base and containing a transparent liquid; a vertical tubular column carried by said base, said column being formed with a vertical slit; a cover at the upper end of said column, said cover being formed with an inner chamber; a vertical transparent tube extending within said column from said base to said cover, the lower end of said tube being in communication with said reservoir and the upper end of said tube opening into said chamber; a second tube extending vertically within said column from said chamber to said base, the lower end of said tube being in communication with a nozzle carried by said base and adapted for connection with a space wherein a negative pressure is to be measured; a second nozzle carried by said base and communicating with the upper part of said reservoir, said second nozzle being adapted for connection with a space wherein a positive pressure is to be measured; a vertical rotatable screw extending within said column; means on said base to manually rotate said screw; a carriage carried by said screw and having screw-threaded portions engaging the screw threads thereof, said carriage being formed with an outwardly extending arm passing through said slit to be guided thereby; an electric bulb supported by said carriage in close proximity of said transparent tube and adapted to illuminate the lower face of the meniscus formed by said liquid in said transparent tube for a proper position of said carriage; a horizontal sighting telescope supported by the outer end of said arm above said bulb and adapted for observation through said slit of the image of said bulb formed by the lower face of said meniscus; a vertical metallic tube disposed on said second-named tube but electrically insulated therefrom; brush means carried by said carriage in insulated relation thereto, said brush means being electrically connected with said bulb; and means to supply electric current to said last-named insulated tube.

2. In a pressure gauge as claimed in claim 1, said column carrying a vertical scale and said arm supporting a vernier adapted for cooperation with said scale.

3. In a pressure gauge as claimed in claim 1, liquid damping means interposed between said reservoir and said transparent tube.

PAUL MONDET.

REFERENCES CITED

The following references are of record in the file of this patent:

UNITED STATES PATENTS

| Number | Name | Date |
|---|---|---|
| 2,091,303 | Brelsford | Aug. 31, 1937 |
| 2,197,205 | Cooper | Apr. 16, 1940 |
| 2,496,447 | Dresser | Feb. 7, 1950 |

FOREIGN PATENTS

| Number | Country | Date |
|---|---|---|
| 895,939 | France | Apr. 17, 1944 |